United States Patent [19]

Howard et al.

[11] Patent Number: 4,809,109
[45] Date of Patent: Feb. 28, 1989

[54] MAGNETORESISTIVE READ TRANSDUCER AND METHOD FOR MAKING THE IMPROVED TRANSDUCER

[75] Inventors: James K. Howard, Morgan Hill; Michael F. Toney, San Jose; Ching H. Tsang, Sunnyvale, all of Calif.

[73] Assignee: International Business Machines Corporation, Armonk, N.Y.

[21] Appl. No.: 173,496

[22] Filed: Mar. 25, 1988

[51] Int. Cl.$^4$ .............................. G11B 5/30; G11B 5/42
[52] U.S. Cl. ..................................... 360/113; 29/603; 427/131; 428/611; 428/900
[58] Field of Search .................. 360/110, 113; 29/603; 428/900, 928, 611; 427/47, 131

[56] References Cited

U.S. PATENT DOCUMENTS 4,103,315 7/1978 Hempstead et al. ................ 360/110
4,713,708 12/1987 Krounbi et al. ..................... 360/113

OTHER PUBLICATIONS

IEEE Tran. on Mag. MAG-1, Mar. 1965, pp. 63-65, entitled "Magnetic Properties of Multilayer Films of FeNi—Mn—FeNiCo and of FeNi—Mn" by Massenet et al.

J. Appl. Phys., vol. 39, No. 2, Feb. 1968, pp. 1389-1390, entitled "Spin-Wave Resonance in Epitaxial Fe—Ni Films and in Coupled Double Layers of Epitaxial Fe—Ni and Fe—Ni—Mn" by Waksmann et al.

J. Appl. Phys., vol. 52, No. 3, Mar. 1981, pp. 2471-2473, entitled "Exchange Induced Unidirectional Anisotropy at FeMn—Ni$_{80}$Fe$_{20}$ Interfaces" by Tsang et al.

*Primary Examiner*—Carl E. Hall
*Attorney, Agent, or Firm*—Otto Schmid, Jr.

[57] ABSTRACT

An improved magnetoresistive (MR) read transducer in which a layered structure comprising an antiferromagnetic layer in direct contact with an MR layer is subjected to a thermal annealing process by heating the structure to a temperature within a chosen range for a chosen time so that a new ternary antiferromagnetic alloy is formed by diffusion. The ternary antiferromagnetic alloy has a high value of exchange bias which is less temperature sensitive. In a specific embodiment in which the MR layer is NiFe and the antiferromagnetic layer is FeMn, the ternary alloy formed by heating the structure to a temperature within the range of 260° C. to 350° C. for 50 to 20 hours has a room temperature exchange bias field with NiFe of about 50 Oersted and an ordering temperature which exceeds 300° C.

8 Claims, 3 Drawing Sheets

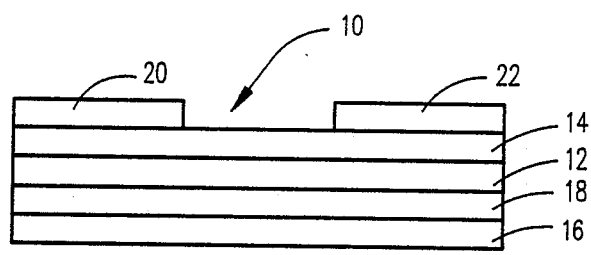
FIG. 1
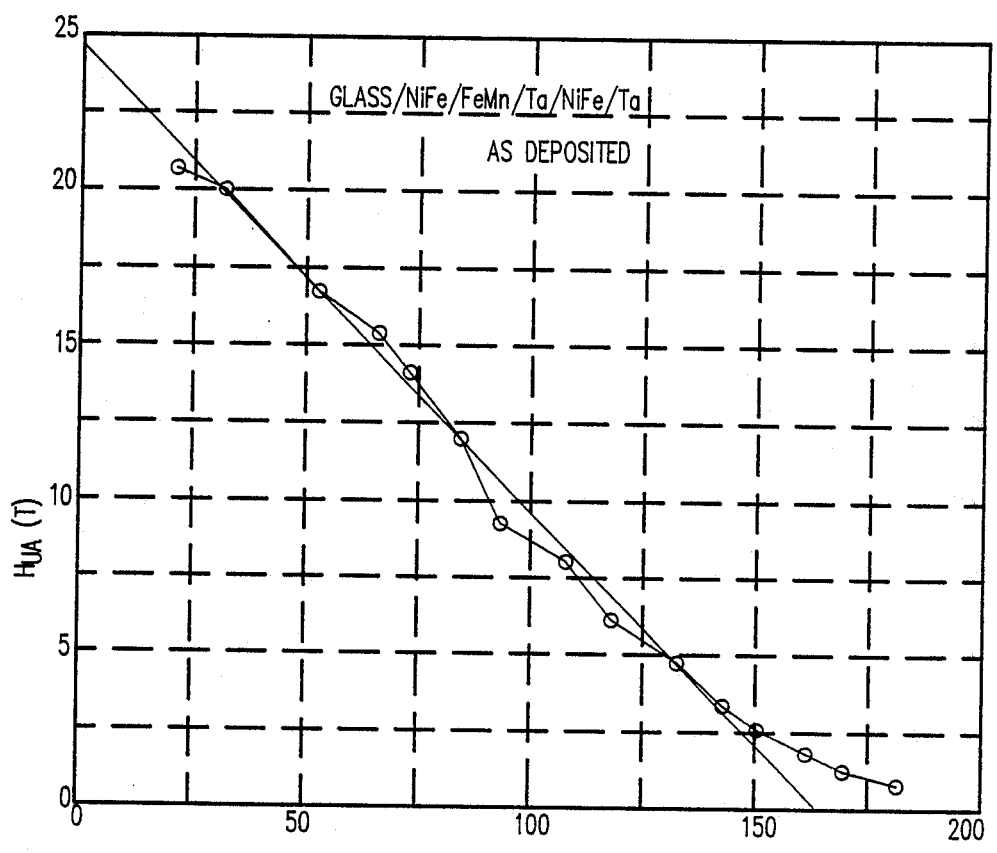
FIG. 2 TEMPERATURE (°C)

MAGNETORESISTIVE READ TRANSDUCER AND METHOD FOR MAKING THE IMPROVED TRANSDUCER

BACKGROUND OF THE INVENTION

1. Field of the Invention

This invention relates in general to magnetic transducers for reading information signals from a magnetic medium and, in particular, to an improved magnetoresistive read transducer and a method for making the improved transducer.

2. Description of the Prior Art

The prior art discloses a magnetic transducer referred to as a magnetoresistive (MR) sensor or head which has been shown to be capable of reading data from a magnetic surface at great linear densities. An MR sensor detects magnetic field signals through the resistance changes of a read element made from a magnetoresistive material as a function of the amount and direction of magnetic flux being sensed by the element.

The prior art also teaches that in order for a MR sensor to operate optimally, two bias fields should be provided. In order to bias the material so that its response to a flux field is linear, a transverse bias field is generally provided. This bias field is normal to the plane of the magnetic media and parallel to the surface of the planar MR sensor.

The other bias field which is usually employed with MR sensors is referred to in the art as the longitudinal bias field, which extends parallel to the surface of the magnetic media and parallel to the lengthwise direction of the MR sensor. The function of the longitudinal bias field is to suppress Barkhausen noise, which originates from multi-domain activities in the MR sensor.

A MR sensor for reading information signals from a magnetic recording medium is described in U.S. Pat. No. 4,103,315 to Hempstead, et al., which is assigned to the same assignee as this application. The '315 patent describes a MR read sensor which utilizes antiferromagnetic-ferromagnetic exchange coupling to produce a uniform longitudinal bias in the MR layer of the sensor.

The materials suggested by the '315 patent are nickel-iron (NiFe) as the ferromagnetic MR layer and a manganese (Mn) alloy as the antiferromagnetic layer. Of the possible Mn alloys, iron-manganese (FeMn) appears to exhibit the greatest ability to exchange couple with the NiFe layer, and the FeMn is deposited directly on the NiFe to obtain the exchange bias effect.

The strength of the exchange bias field for exchange coupled films of sputter deposited NiFe and FeMn films has been studied by Tsang, et al. in "Exchange Induced Unidirectional Anisotropy at FeMn-Ni$_{80}$Fe$_{20}$ Interfaces", *J. Appl. Phys.* Vol. 52 (3), March, 1981, pp. 2471-2473.

The use of annealing between Mn and NiFe to obtain an antiferromagnetic alloy of high ordering temperature (250° C.) was described by Massenet, et al, in "Magnetic Properties of Multilayer Films of FeNi—Mn—FeNiCo and of FeNi—Mn", *IEEE Tran. on Mag.* MAG-1, March, 1965, p. 63. In the publication "Spin-Wave Resonance in Epitaxial Fe—Ni Films and in Coupled Double Layers of Epitaxial Fe—Ni and Fe—Ni—Mn", Waksmann et al., *Journal of Applied Physics* V39, No. 2, February, 1968, p. 1389, the authors directly evaporated an NiFeMn ternary (around the ordered Ni$_{50}$Mn$_{50}$ region) onto NiFe, and obtained exchange bias which was fairly low (7 Oe. at 400A NiFe) but an ordering temperature which was high (250° C).

The teachings of the prior art have enabled the design of MR sensors which meet prior art requirements. However, the drive toward increased recording density has led to the requirement for narrower recording tracks and increased linear recording density along the tracks. The small MR sensors which are necessary to meet these requirements cannot be made with the use of the prior art techniques due to the low magnitude of the exchange bias field that can be obtained, the pronounced temperature dependence of the magnitude of the exchange bias field, and the low ordering temperature at which the exchange bias field goes to zero.

SUMMARY OF THE INVENTION

It is therefore the principal object of this invention to increase the exchange bias magnitude and reduce its temperature dependence in a magnetoresistive (MR) read transducer.

In accordance with the invention, the objective is achieved by providing a thin MR layer of ferromagnetic material and a thin layer of antiferromagnetic material in direct contact with the MR layer. This layered structure is subjected to a thermal annealing process by heating the structure to a temperature within a predetermined range for a predetermined time to form a ternary antiferromagnetic material at the interface between the MR layer and the layer of antiferromagnetic material, and this ternary antiferromagnetic material produces a high exchange bias with the MR layer and an ordering temperature at which the exchange bias goes to zero which exceeds 300 degrees centigrade.

In a specific embodiment the MR layer comprises NiFe and the layer of antiferromagnetic material comprises FeMn. In this embodiment the thermal annealing process comprises heating the layered structure to a temperature within the range of 260 to 350 degrees centigrade for a time from 50 to 20 hours.

The foregoing and other objects, features and advantages of the invention will be apparent from the following more particular description of a preferred embodiment of the invention as illustrated in the accompanying drawing(s).

BRIEF DESCRIPTION OF THE DRAWINGS

FIG. 1 is an end view of a specific embodiment of a magnetoresistive read transducer assembly according to the present invention.

FIG. 2 is a graph of exchange bias field H$_{UA}$ as a function of temperature for as-deposited NiFe/FeMn films.

DESCRIPTION OF THE PREFERRED EMBODIMENT

Figure 3:
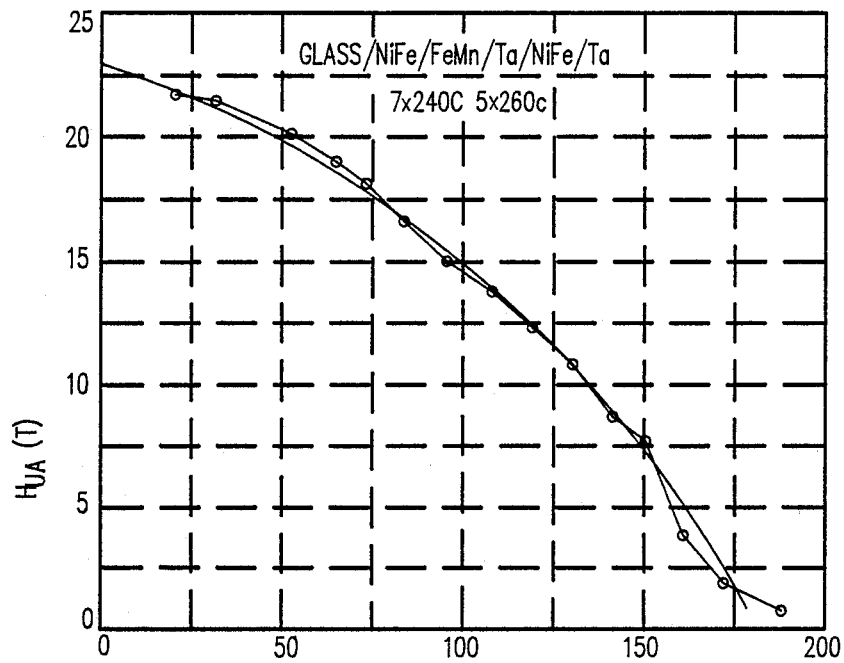
FIG. 3 is a graph of exchange bias field H$_{UA}$ as a function of temperature for NiFe/FeMn films annealed for 7 cycles at 240° C.

A specific embodiment of a magnetoresistive (MR) sensor will be described briefly in conjunction with FIG. 1. The MR sensor 10 comprises a thin MR layer of ferromagnetic material 12. A thin layer of a suitable antiferromagnetic material 14 is deposited on the MR layer 12 with good interfacial atomic contact. A resultant unidirectional anisotropy develops by means of exchange coupling across the interface between the MR layer 12 and antiferromagnetic layer 14 and produces a shift of the MH loop of the MR layer which is usually called the longitudinal exchange bias field $H_{UA}$. The transverse bias is produced by a soft magnetic film layer 16 which is separated from the MR layer 12 by a thin nonmagnetic spacer layer 18 whose purpose is to prevent a magnetic exchange bias between the MR layer 12 and the soft magnetic bias layer 16. Conductor leads 20, 22 are also included for connection to a sensing means for sensing an output signal as is known in the art.

According to the present invention, the preferred material for the MR layer 12 is NiFe, and the preferred material for the antiferromagnetic layer 14 is MnFe. The exchange bias effect renders the NiFe/FeMn couple useful in magnetic recording for the suppression of domain induced Barkhausen noise in small MR sensors. To do this, the direction of the exchange bias is usually oriented along the length of the MR sensor to induce a longitudinal directional preference for the magnetization of the MR sensor, while signal fields excite the sensor orthogonally, along the transverse direction. To be effective, the magnitude of this longitudinal exchange bias, $H_{UA}$, must exceed a certain minimum to counteract demagnetization in the MR geometry and coercivity effects in the MR material. Since the exchange bias magnitude of the NiFe/FeMn couple exhibits rather pronounced temperature dependences, with $H_{UA}$ decreasing linearly towards zero at the ordering temperature, it is important that at the device operating temperature of the MR sensor (usually above room temperature), $H_{UA}$ is still large enough to be effective for domain suppression.

In a specific embodiment, the MR layer 12 was deposited as a layer of NiFe about 400 angstroms thick, the antiferromagnetic layer 14 was deposited as a layer of MnFe about 500 angstroms thick, and a capping layer (not shown) comprising successive layers of tantalum, NiFe and tantalum was deposited over the MnFe layer to prevent oxidation of the MnFe layer. The exchange bias $H_{UA}$ magnitude and its variation with temperature is shown in FIG. 2.

Referring to FIG. 2, it can be seen that the exchange bias field $H_{UA}$ obtained is around 21 Oe. at room temperature (25° C.), which is more than adequate for most MR geometries. However, it can also be seen that the exchange bias field decreases linearly toward zero at the critical ordering temperature, $T_{cr}$, of around 160° C. Therefore, at the maximum device operating temperature, which may be as high as 90° C., for example, the amount of $H_{UA}$ available is significantly reduced to about 10 Oe, which may be close to the minimum threshold requirement, depending on the particular MR sensor design.

To improve upon the as-deposited magnitude of $H_{UA}$ as shown in FIG. 2, it is desirable to increase not only the room temperature magnitude of the exchange bias but also to alter the $H_{UA}(T)$ dependence so that the magnitude of the exchange bias is also sufficiently high at the maximum device operating temperature.

According to the present invention, both the magnitude of the exchange bias field $H_{UA}$ and the temperature dependence of the magnitude of the exchange bias field are improved by means of thermal annealing procedures. Thermal annealing was done in one of two ways. In the first annealing procedure, films were annealed in cycles consisting of 3–4 hours to reach anneal temperature, 3–4 hours at the preset anneal temperature, and 12 hours to cool. These films were first annealed at 245° C. for up to seven cycles, then at 260° C. for up to five cycles. In the second annealing procedure, the films were annealed continuously at 270° C. for up to 60 hours. These annealing times include the 3–4 hours to reach temperature. The MH loops and temperature dependence of the exchange bias, $H_{UA}(T)$, were measured before and after each annealing step, and Auger compositional analysis were performed to correlate magnetic behavior to composition changes.

The resultant $H_{UA}(T)$ for the films after 7 cycles at 245° C. plus 5 cycles at 260° C. is shown in FIG. 3. This plot shows that the room temperature value has increased slightly, that the shape of $H_{UA}(T)$ is now convex instead of linear, and that the ordering temperature $T_{CR}$ has increased to about 180° C. These results suggest that, with moderate annealing, the uniformity of exchange conditions at the interface is improved, so that the couple is now a better approximation to the ideal case of a sharp and uniform interface, which would have a Brillioun function $H_{UA}(T)$ going to zero at the Neel temperature of FeMn (around 240° C).

Figure 4:
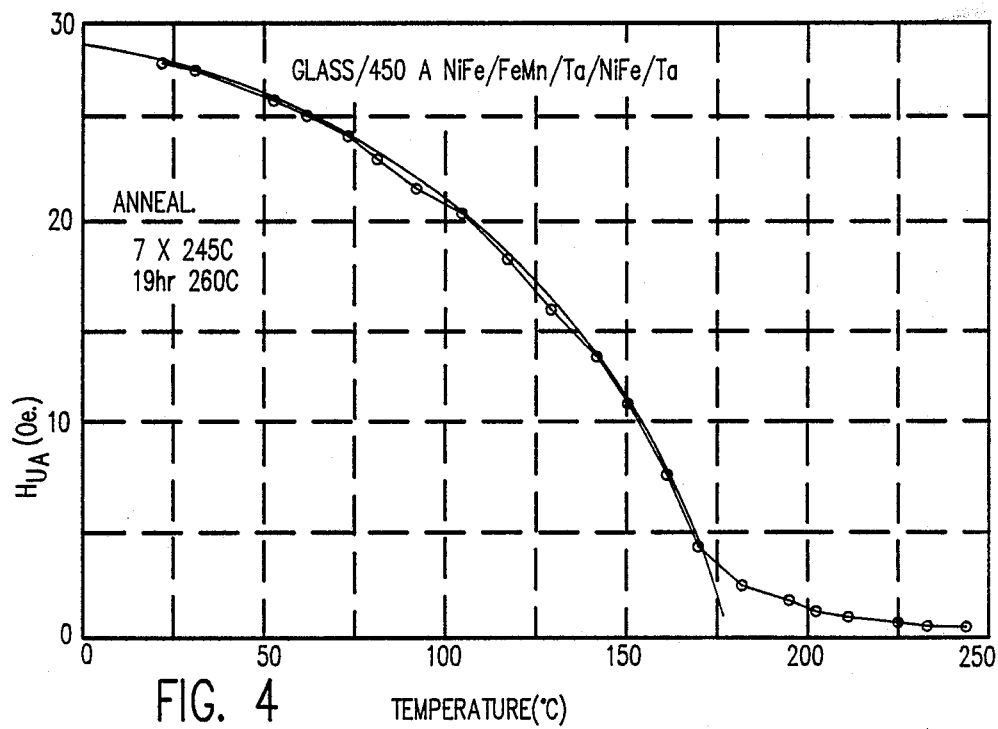
FIG. 4 is a graph of exchange bias field H$_{UA}$ as a function of temperature for NiFe/FeMn films annealed for 7 cycles at 245° C. followed by continuous annealing for 19 hours at 260° C.

The plot in FIG. 4 shows $H_{UA}(T)$ with the previous heat treatment plus 19 hours of continuous annealing at 260° C. The curve has become more convex, but the ordering temperature $T_{CR}$ has not changed much, remaining around 180° C.

Figure 5:
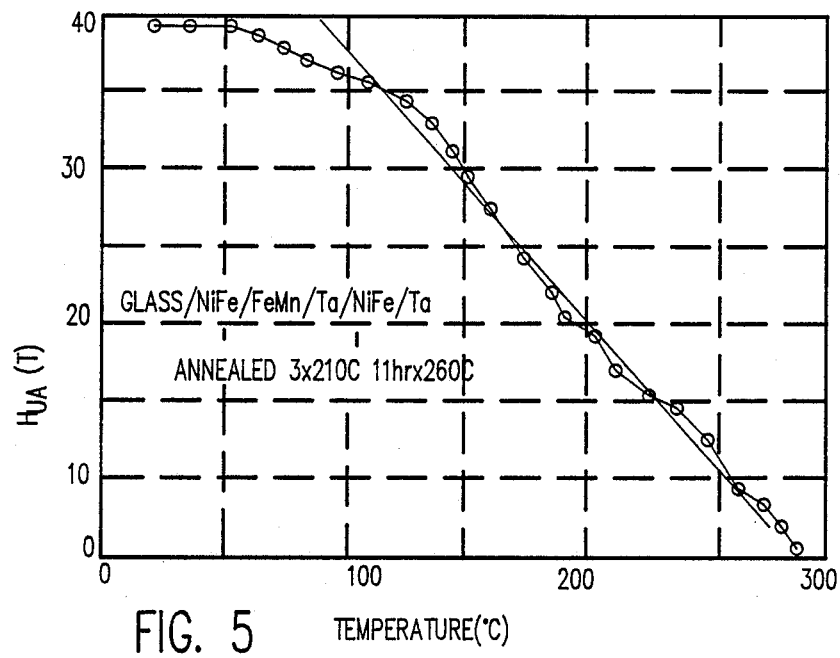
FIG. 5 is a graph of exchange bias field H$_{UA}$ as a function of temperature for NiFe/FeMn films annealed for 3 cycles at 240° C. followed by continuous annealing for 41 hours at 260° C.

The plot in FIG. 5 shows $H_{UA}(T)$ for a thermal annealing treatment of 3 cycles at 240° C. plus 41 hours of continuous annealing at 260° C. Here the room temperature value of $H_{UA}$ has increased to about 40 Oe., and the shape of $H_{UA}(T)$ has changed once more so that it is convex at lower temperatures (below about 150° C.) and becomes almost linear again at higher temperatures. The ordering temperature has increased drastically to about 300° C. Since $H_{UA}$ has now shifted to a temperature exceeding 240° C., the Neel temperature of FeMn, it must be concluded that now the NiFe is exchange coupled to a different antiferromagnet characterized by a stronger antiferromagnetic order. In addition, the reappearance of linear behavior in $H_{UA}(T)$ suggests that the conversion of FeMn antiferromagnetism at the interface into this new antiferromagnetic system may be very non-uniform, forming a series of intermediate alloys along the exchange path at the interface.

Figure 6:
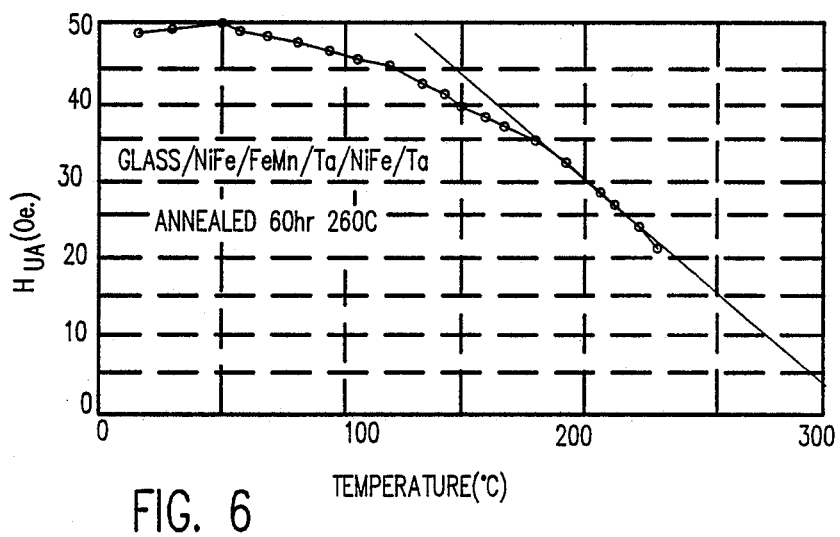
FIG. 6 is a graph of exchange bias field H$_{UA}$ as a function of temperature for NiFe/FeMn films annealed continuously for 60 hours at 260° C.

The plot in FIG. 6 shows $H_{UA}(T)$ for a thermal annealing treatment of 60 hours of continuous annealing at 260° C. In this case the room temperature value of $H_{UA}$ reaches about 50 Oe., the shape of $H_{UA}(T)$ becomes more convex at lower temperatures, and is still essentially linear at higher temperatures. The ordering temperature now exceeds 300° C. With extended annealing, a change of the antiferromagnet exchange coupling to the NiFe has occurred. This change is due to interdiffusion which has converted the FeMn near the interface into another alloy that exhibits very high Neel temperatures and strong exchange bias effects.

A likely candidate for the new alloy is the antiferromagnetic ordered MnNi-type alloys, which exhibit Neel temperatures as high as 800° C. around the 50:50 MnNi composition. Auger analysis of the annealed structures indicates that only a partially ordered or even disordered form of these alloys has been formed in the results described here, so the resultant Neel temperatures were significantly reduced from 800° C., but were still substantially higher than that for FeMn. The results of our Auger composition analysis indicates that the alloy composition was approximately $Ni_{40}Mn_{40}Fe_{20}$ for a specific embodiment. We have, through extended annealing, and the resulting interdiffusion, created a series of NiFeMn ternary alloys in the NiMn antiferromagnetic regime.

There are other types of thermal treatments which can accomplish the same objectives as the specific examples given here. For example, the temperature for the continuous annealing for a specified time can be increased to the level of about 350° C. without adverse effects on the MR sensor. At these higher temperatures, less time is required to achieve the same thermal annealing effect. It is also possible that the same effect can be achieved by a higher temperature for a shorter time by the use of techniques such as laser annealing or flash annealing.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new, and desire to secure by Letters Patent is:

1. A method for making a magnetoresistive read transducer assembly comprising the steps of:
   depositing a thin magnetoresistive layer of ferromagnetic material;
   depositing a thin layer of antiferromagnetic material in direct contact with the magnetoresistive layer; and
   heating said layered structure to a temperature within a predetermined range for a predetermined time to form a ternary antiferromagnetic material at the interface between said magnetoresistive layer and said layer of antiferromagnetic material whereby said ternary antiferromagnetic material produces a high exchange bias field with said magnetoresistive layer and said ternary antiferromagnetic material exhibits an ordering temperature exceeding 300 degrees centigrade.

2. The method according to claim 1 wherein said magnetoresistive layer comprises an alloy of nickel and iron and said antiferromagnetic layer comprises an alloy of iron and manganese.

3. The method of claim 2 wherein said heating step is conducted at a temperature within the range of 260 to 350 degrees centigrade for a time within the range of 20 to 50 hours.

4. The method of claim 2 wherein said ternary antiferromagnetic material is an alloy comprising nickel, iron and manganese.

5. A magnetoresistive read transducer assembly comprising:
   a thin magnetoresistive layer of ferromagnetic material;
   a thin layer of antiferromagnetic material in direct contact with the magnetoresistive layer; and
   a thermally formed ternary antiferromagnetic material at the interface between said magnetoresistive layer and said layer of antiferromagnetic material whereby said ternary antiferromagnetic material produces a high exchange bias field with said magnetoresistive layer and said ternary antiferromagnetic material exhibits an ordering temperature exceeding 300 degrees centigrade.

6. The magnetoresistive read transducer assembly of claim 5 wherein said magnetoresistive layer comprises an alloy of nickel and iron and said antiferromagnetic layer comprises an alloy of iron and manganese.

7. The magnetoresistive read transducer assembly of claim 6 wherein said ternary antiferromagnetic material is an alloy comprising nickel, iron and manganese.

8. The magnetoresistive read transducer assembly of claim 7 wherein said ternary antiferromagnetic alloy comprises $Ni_{40}Mn_{40}Fe_{20}$.

* * * * *